United States Patent
Bhongale et al.

(10) Patent No.: US 10,364,673 B1
(45) Date of Patent: Jul. 30, 2019

(54) FLUID IMAGING IN A BOREHOLE

(71) Applicant: Halliburton Energy Services, Inc., Houston, TX (US)

(72) Inventors: Satyan Gopal Bhongale, Cypress, TX (US); John L. Maida, Jr., Houston, TX (US); Wolfgang Hartmut Nitsche, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/545,890

(22) PCT Filed: Sep. 29, 2016

(86) PCT No.: PCT/US2016/054409
§ 371 (c)(1),
(2) Date: Jul. 24, 2017

(87) PCT Pub. No.: WO2018/063237
PCT Pub. Date: Apr. 5, 2018

(51) Int. Cl.
*E21B 49/08* (2006.01)
*G01V 8/24* (2006.01)
*G01V 8/00* (2006.01)

(52) U.S. Cl.
CPC ............ *E21B 49/08* (2013.01); *G01V 8/005* (2013.01); *G01V 8/24* (2013.01); *E21B 2049/085* (2013.01)

(58) Field of Classification Search
CPC ..... E21B 49/08; E21B 2049/085; G01V 8/24; G01V 8/005
USPC ........................ 250/338.1, 266, 269.1, 269.3
See application file for complete search history.

(56) References Cited

U.S. PATENT DOCUMENTS

| | | | | |
|---|---|---|---|---|
| 2,986,639 A | * | 5/1961 | Josendal | E21B 47/1015 250/254 |
| 4,829,176 A | * | 5/1989 | Paske | G01V 5/12 250/254 |
| 4,894,534 A | * | 1/1990 | Paske | G01V 5/125 250/254 |
| 6,355,928 B1 | | 3/2002 | Skinner et al. | |
| 8,916,815 B2 | | 12/2014 | Xie et al. | |

(Continued)

FOREIGN PATENT DOCUMENTS

| CN | 103175788 A | 6/2013 |
|---|---|---|
| WO | WO 2009/070667 A1 | 6/2009 |
| WO | WO 2014/027322 A2 | 2/2014 |

OTHER PUBLICATIONS

Bochmann, et al., "Nanomechanical Coupling Between Microwave and Optical Photons," *Nature Physics*, vol. 9, No. 11, Nov. 1, 2013.

(Continued)

*Primary Examiner* — David P Porta
*Assistant Examiner* — Gisselle Gutierrez
(74) *Attorney, Agent, or Firm* — Haynes and Boone, LLP

(57) ABSTRACT

A borehole fluid imaging system includes a plurality of radiation sources located circumferentially around the borehole. A plurality of radiation detectors are located circumferentially around the borehole. The plurality of radiation detectors detect the radiation transmitted by each of the respective ones of the plurality of radiation sources. A controller is coupled to the plurality of radiation detectors to determine an attenuation of the radiation at the plurality of detectors and generate an image of the fluid in response to the attenuation of the radiation.

20 Claims, 11 Drawing Sheets

(56) References Cited

U.S. PATENT DOCUMENTS

| | | | |
|---|---|---|---|
| 2003/0062158 A1* | 4/2003 | Spross | E21B 49/00 166/254.2 |
| 2005/0075853 A1* | 4/2005 | Spross | E21B 49/00 703/10 |
| 2006/0131496 A1* | 6/2006 | Fitzgerald | G01F 1/74 250/253 |
| 2007/0040110 A1* | 2/2007 | Ellis | E21B 47/082 250/266 |
| 2007/0120051 A1 | 5/2007 | Difoggio et al. | |
| 2008/0061225 A1* | 3/2008 | Orban | G01V 5/125 250/269.3 |
| 2008/0267345 A1* | 10/2008 | Nagumo | G01B 15/025 378/11 |
| 2009/0296086 A1 | 12/2009 | Appel et al. | |
| 2012/0169841 A1* | 7/2012 | Chemali | E21B 47/0002 348/36 |
| 2012/0211649 A1 | 8/2012 | Hallunbdaek et al. | |
| 2014/0246574 A1 | 9/2014 | Pope et al. | |
| 2015/0086152 A1 | 3/2015 | Samson et al. | |
| 2015/0235357 A1* | 8/2015 | Nagashima | G01N 23/043 382/141 |
| 2017/0061598 A1* | 3/2017 | Nagashima | G01N 23/04 |

OTHER PUBLICATIONS

International Search Report and the Written Opinion of the International Search Authority, or the Declaration, dated Jun. 14, 2017, PCT/US2016/054409, 15 pages, ISA/KR.

* cited by examiner

FLUID IMAGING IN A BOREHOLE

PRIORITY

The present application is a U.S. National Stage patent application of International Patent Application No. PCT/US2016/054409, filed on Sep. 29, 2016, the benefit of which is claimed and the disclosure of which is incorporated herein by reference in its entirety.

BACKGROUND

During pumping of hydrocarbons from a well, the resulting liquids are typically a mixture of oil, natural gas, and water. The water produced from the well is undesirable since it has to be disposed of using an environmentally acceptable method. Thus, it is typically desirable to know the water cut (i.e., ratio of water to total volume of produced liquids) of the fluid being removed from the geological formation in order to know when a particular region produces too much water to make the well economically viable.

DETAILED DESCRIPTION

Some of the challenges noted above, as well as others, may be addressed by a plurality of radiation sources and a plurality of radiation detectors located circumferentially around a borehole. The radiation sources transmit radiation (e.g., terahertz (THz) radiation, microwave radiation, infrared radiation, or any other electromagnetic radiation) into a fluid in the borehole while the radiation detectors receive that transmitted radiation. Using water's property of absorbing certain frequencies of electromagnetic radiation to produce signal attenuation of that radiation, a chemical composition (e.g., water cut) of the fluid may be determined by analysis of the received radiation. For example, a spatial distribution of oil, gas, and water can be used to generate a three-dimension image of the fluid in the borehole. The image may be used to determine the fluid's chemical composition (e.g., water cut).

Distribution of the radiation sources and detectors around the circumference of the borehole may typically be accomplished, for mechanical mounting purposes, using a pipe in the borehole with the sources and detectors mounted circumferentially around the pipe. However, radiation sources and detectors located circumferentially around the borehole may also be defined as the radiation sources and detectors located circumferentially around the borehole walls.

For purposes of illustration only, subsequently described embodiments show the plurality of radiation sources and the plurality of radiation detectors as alternating between source and detector. There is no requirement that the sources and detectors alternate in this manner. Similarly, an equal number of sources and detectors are shown in each embodiment only for purposes of illustration. Other embodiments may use a fewer or greater number of detectors than sources.

Figure 1:
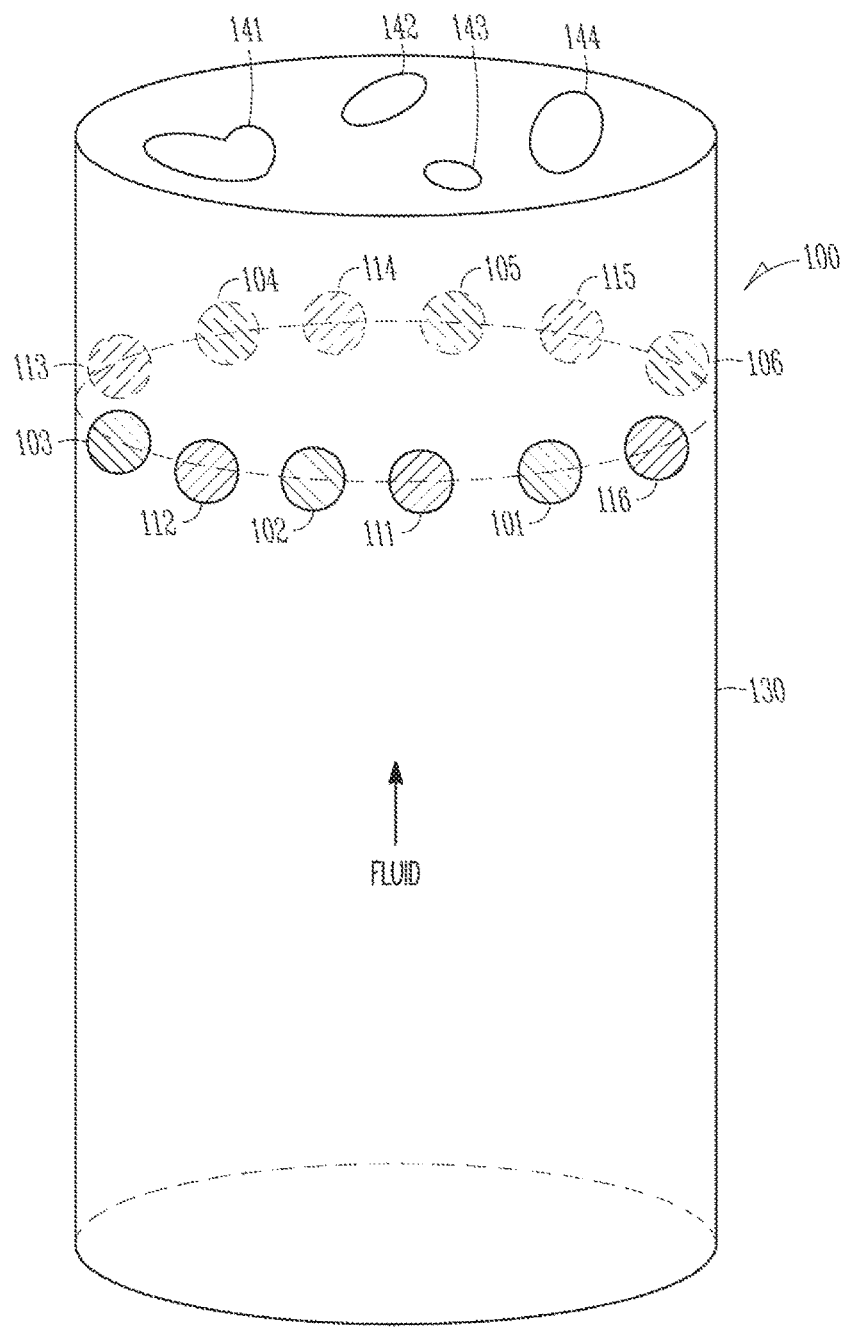
FIG. 1 is a diagram showing a system of radiation sources and radiation detectors located circumferentially around a borehole in a single circular pattern, according to various embodiments.

FIG. 1 is a diagram showing a system of radiation sources 101-106 and radiation detectors 111-116 located circumferentially around a borehole 130 in a single circular pattern 100, according to various embodiments. As defined previously, the borehole 130 may represent a pipe in the borehole or the actual borehole walls.

A fluid is located in the borehole 130 and may be flowing through the borehole or pipe. It may be desirable to determine a chemical composition of the fluid in response to the signal attenuation. For example, this may be accomplished by generating a three-dimensional image of the fluid in response to signal attenuation, as described subsequently. The three-dimensional image of the fluid may be used to determine an amount of any water 141-144. Other embodiments may use the three-dimensional image to determine other chemical characteristics of the fluid in response to the level of signal attenuation.

In an embodiment, the plurality of radiation sources 101-106 and the plurality of radiation detectors 111-116 are shown located in the borehole 130 in an alternating pattern of radiation sources and radiation detectors. This embodiment includes the plurality of radiation sources 101-106 and the plurality of radiation detectors 111-116 in a circular pattern 100 circumferentially around the borehole.

Figure 2:
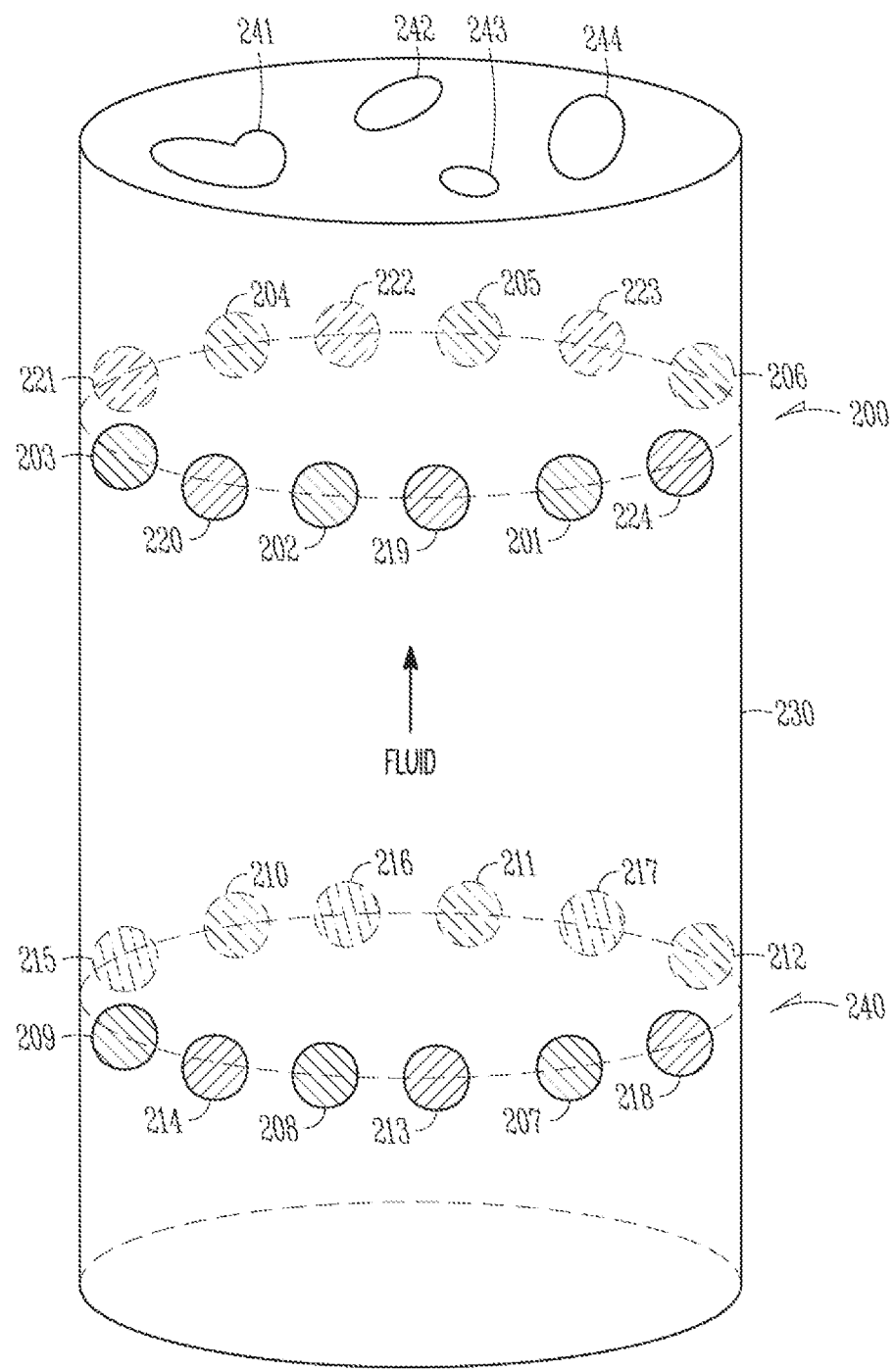
FIG. 2 is a diagram showing a system of radiation sources and radiation detectors located circumferentially around a borehole in multiple circular patterns, according to various embodiments.

FIG. 2 is a diagram showing a system of radiation sources 201-212 and radiation detectors 213-224 located circumferentially around a borehole 230 in multiple circular patterns 200, 240, according to various embodiments. As defined previously, the borehole 230 may represent a pipe in the borehole or the actual borehole walls.

A fluid is located in the borehole 230 and may be flowing through the borehole or pipe. It may be desirable to determine a chemical composition of the fluid in response to the signal attenuation. For example, this may be accomplished by generating a three-dimensional image of the fluid in response to signal attenuation, as described subsequently. The three-dimensional image of the fluid may be used to determine an amount of any water 241-244. Other embodiments may use the three-dimensional image to determine other chemical characteristics of the fluid in response to the level of signal attenuation.

In an embodiment, the plurality of radiation sources 201-212 and the plurality of radiation detectors 213-224 are located in the borehole 230 in a plurality of alternating circular patterns 200, 240 of radiation sources and radiation detectors circumferentially around the borehole. While only two circular patterns 200, 240 of sources and detectors are shown, other embodiments may include more than two circular patterns 200, 240. For example, a relatively long pipe or borehole (e.g., measured in meters or kilometers) may include a circular pattern of sources and detectors at various periodic or non-periodic distances along the pipe or borehole length.

Figure 3:
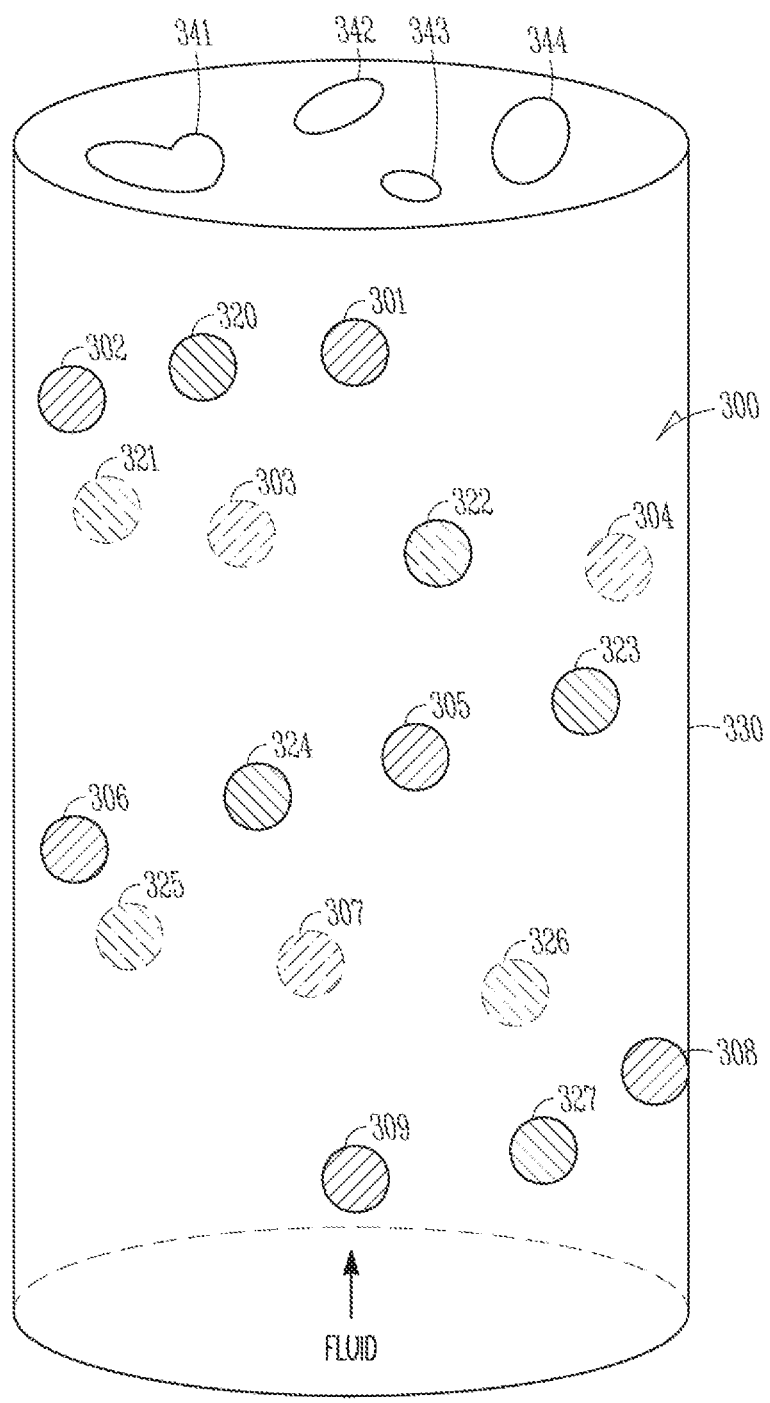
FIG. 3 is a diagram showing a system of radiation sources and radiation detectors located circumferentially around a borehole in a helical pattern, according to various embodiments.

FIG. 3 is a diagram showing a system of radiation sources 301-309 and radiation detectors 320-327 located circumferentially around a borehole in a helical pattern 300, according to various embodiments. As defined previously, the borehole 330 may represent a pipe in the borehole or the actual borehole walls.

A fluid is located in the borehole 330 and may be flowing through the borehole or pipe. It may be desirable to determine a chemical composition of the fluid in response to the signal attenuation. For example, this may be accomplished by generating a three-dimensional image of the fluid in response to signal attenuation, as described subsequently. The three-dimensional image of the fluid may be used to determine an amount of any water 341-344. Other embodiments may use the three-dimensional image to determine other chemical characteristics of the fluid in response to the level of signal attenuation.

Figure 4:
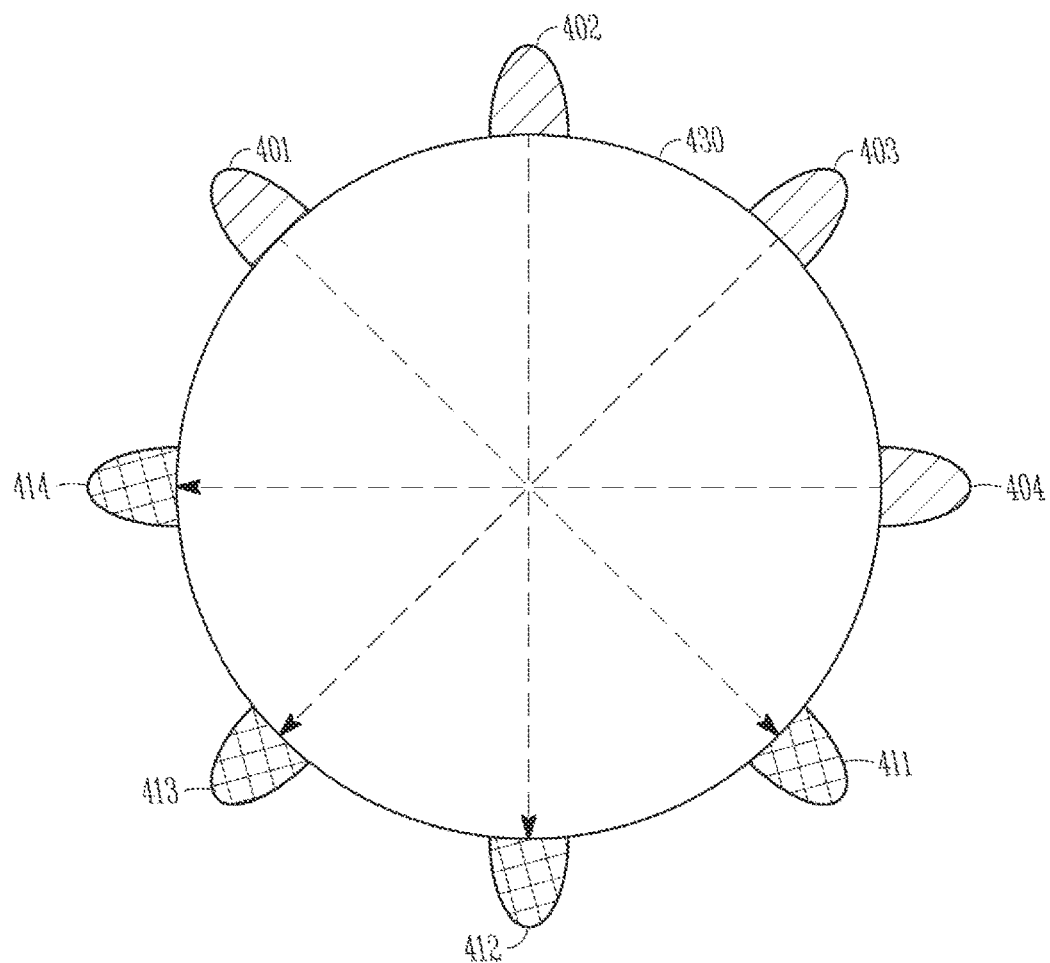
FIG. 4 is a diagram showing a system of radiation sources and radiation detectors located circumferentially around a borehole in a source and detector matching pattern, according to various embodiments.

FIG. 4 is a diagram showing a system of radiation sources 401-404 and radiation detectors 411-414 located circumferentially around a borehole 430 in a source and detector matching pattern, according to various embodiments. As defined previously, the borehole 430 may represent a pipe in the borehole or the actual borehole walls.

This embodiment includes a radiation source 401-404 located across the borehole 430 from a respective radiation detector 411-414. Thus, each radiation source is paired with a respective radiation detector.

This embodiment is not limited to single circular pattern as shown in FIG. 4. The source and detector matching pattern embodiment may be combined with any other embodiments. The pattern of sources 401-404 and detectors 411-414 may also be an alternating pattern as shown in FIGS. 1-3 while still maintaining the source-detector paired aspect.

The above-described embodiments are only used as an illustration of various configurations of radiation sources and radiation detectors. Any of the above-described embodiments may be combined to form other configurations.

The radiation sources may be realized in various ways. For example, each source may be an opening coupled to a THz waveguide (see FIG. 7). The opening may be sealed with sapphire, TEFLON®, or any other material that is transparent for THz radiation but which prevents liquids from flowing into the waveguide.

In another embodiment, each source may be a selectable waveguide window (e.g., lens) for the THz radiation and, instead of switching a THz source on and off, each selectable waveguide window is configured to be selectable between being transparent to the radiation and opaque to the radiation. In another embodiment, the selectable waveguide windows may be configured to be switched between open and closed.

Figure 5:
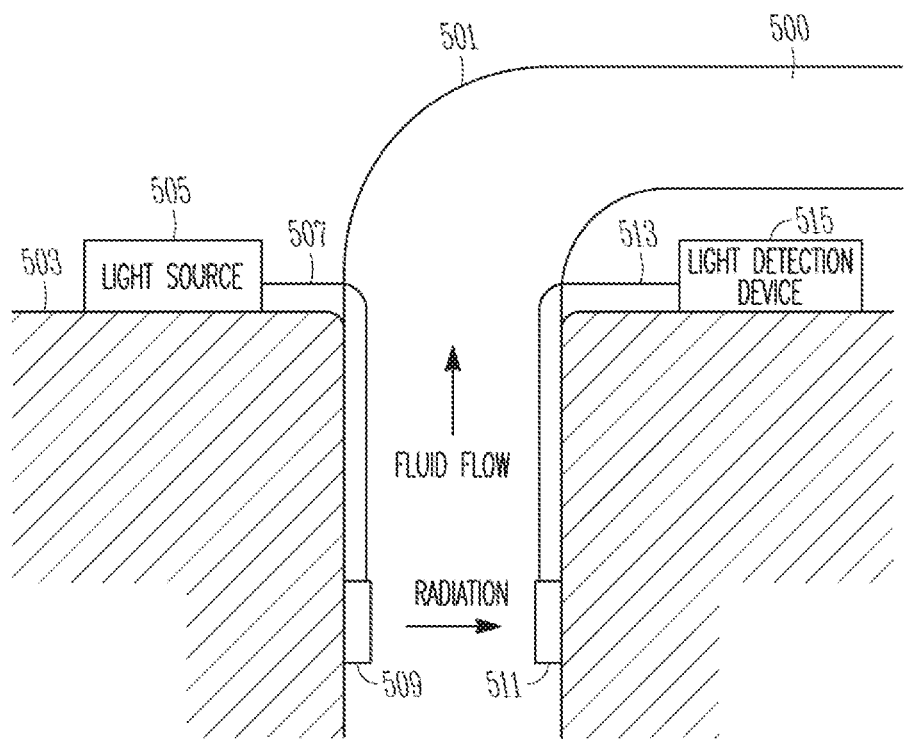
FIG. 5 is a diagram of a system incorporating an electro-opto-mechanical device, according to various embodiments.
Figure 6:
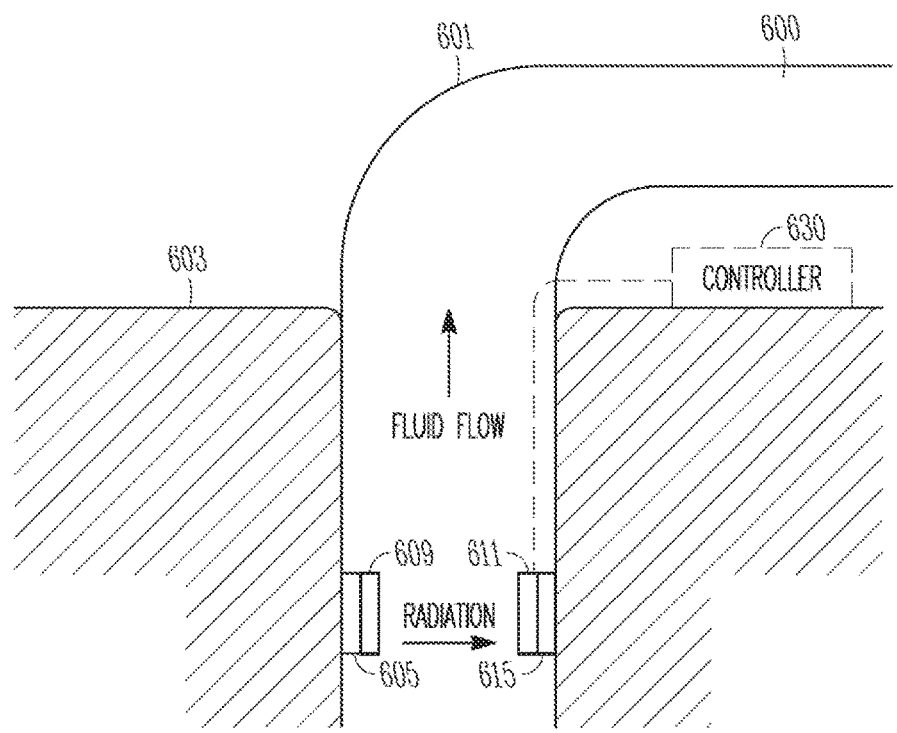
FIG. 6 is a diagram of another system incorporating the electro-opto-mechanical device, according to various embodiments.

Other embodiments may use a light source coupled to one or more electro-opto-mechanical devices to generate microwave or THz radiation (see FIGS. 5 and 6). A mechanical switch may be used to determine to which device the light is sent. In another embodiment, the light may be transmitted to all devices and the switch used to turn the devices on and off by changing their bias voltage.

The radiation detectors are sensitive to the same frequency band of radiation as that transmitted by the sources. The radiation detectors may be realized using various embodiments. For example, semiconductor detectors (e.g., photo-diode) that produce an electric output signal proportional to the radiation (e.g., THz, microwave, infrared, other electromagnetic signals) signal hitting the detector.

The detectors may also be openings (e.g., lenses) coupled to fiber optic cables or waveguides. For example, if the radiation is detected downhole and returned to the surface for measurements, the fiber optic cables or waveguides propagate the received radiation to the surface detectors and controller for measurement.

As discussed previously, the present embodiments are not limited to any one form of electromagnetic radiation to be transmitted from the radiation sources. For example, one form of radiation may be microwaves. FIGS. 5 and 6 discuss different embodiments for generating microwave radiation downhole.

FIG. 5 is a diagram of a system incorporating an electro-opto-mechanical device, according to various embodiments. This embodiment illustrates a pipe 501 having a fluid 500 flowing in the pipe. The fluid 500 may be liquid or gaseous hydrocarbons being pumped from a well.

A light source (e.g., laser) 505 may be located on the surface 503 of a geological formation and generates a first light signal that is transmitted through a fiber optic cable 507 that is coupled to a first electro-opto-mechanical device 509 (e.g., transmitter). The first electro-opto-mechanical device 509 acts as a radiation source to convert the light signal from the fiber optic cable 507 into microwave radiation that is transmitted through the fluid 500. For purposes of clarity, only one source 509 is shown but one skilled in the art would realize that any of the above-described embodiments with a plurality of sources may be implemented in this embodiment. Thus, block 509 actually represents a plurality of radiation sources 509.

A second electro-opto-mechanical device 511 is located diametrically across the pipe 501 from the source electro-opto-mechanical device 509. The second electro-opto-mechanical device 511 acts as a radiation detector to convert any received microwave radiation into a second light signal that is transmitted over a fiber optic cable 513 that is coupled to a light detection device 515 (e.g., photodiode) located on the surface 503. For purposes of clarity, only one detector 511 is shown but one skilled in the art would realize that any of the above-described embodiments with a plurality of detectors may be implemented in this embodiment. Thus, block 511 actually represents a plurality of radiation detectors 511.

In operation, a light signal is generated by the light source 505 and transmitted through the fiber optic cable 507 downhole to the source electro-opto-mechanical devices 509. The source electro-opto-mechanical devices 509 respectively convert the light signal to microwave radiation that is transmitted through the fluid 500 to the plurality of detectors 511. As previously described, only one source 509 is transmitting at any one time. The detector electro-opto-mechanical devices 511 receive the transmitted microwave radiation and convert the received microwave radiation to a light signal for transmission uphole through the fiber optic cable 513 to the light detection device 515 with a controller. The light detection device 515 converts the received light signal to an electrical signal for analysis by the controller (shown in systems of FIGS. 9-11). In another embodiment, an optical coupler may be used to enable the detector electro-opto-mechanical device 511 to use the same fiber optic cable 507 as that used by the source electro-opto-mechanical device 509.

The electrical signals from all of the detectors provide a spatial orientation indication of the fluid chemical composition properties of the fluid 500. For example, since water is typically more absorbent at certain microwave frequencies than other known components in the fluid, the electrical signals together provide a spatial indication of the attenuation of the received microwave radiation, as compared to the transmitted microwave radiation. The microwave radiation attenuation depends on the amount of water in the fluid; the greater the attenuation the more water is in the fluid (i.e., higher water cut). Other chemical properties may also be determined based on either the received light signal or the electrical signal.

While the embodiment of FIG. 5 uses microwave radiation, this embodiment may also incorporate frequency multipliers into block 509 so that the microwave frequency of the converted light signals are upconverted to THz radiation. The operation of this embodiment would otherwise be substantially similar.

FIG. 6 is a diagram of another system incorporating the electro-opto-mechanical device, according to various embodiments. This embodiment incorporates both the light source 605 and the light detection device 615 downhole instead of on the surface 603 as illustrated in FIG. 5.

The system of FIG. 6 operates in a pipe 601 containing a fluid 600. The light source 605 is coupled to the source electro-opto-mechanical devices 609 downhole. The light source 605 and the source electro-opto-mechanical devices 609 may be part of the same assembly or separate and coupled by a shorter fiber optic cable (not shown) than used in the embodiment of FIG. 5.

Similarly, the light detection device 615 is coupled to the detector electro-opto-mechanical devices 611 downhole. The light detection device 615 and the detector electro-opto-mechanical devices 611 may be part of the same assembly or separate and coupled by a shorter fiber optic cable (not shown) than used in the embodiment of FIG. 5.

Since the light detection device 615 converts the light signal from the detector electro-opto-mechanical devices 611 to an electrical signal, some mechanism is used to transfer a representation of the electrical signal to the surface 603 for analysis by a controller 630. For example, mud pulse telemetry may be used to transmit the representation of the electrical signal to the surface controller 630. In another embodiment, an electrical cable may connect the light detection device 615 to the controller 630 and transmit the electrical signal from the light detection device 615 to the controller 630.

While the embodiment of FIG. 6 uses microwave radiation, this embodiment may also incorporate frequency multipliers into block 609 so that the microwave frequency of the converted light signals are upconverted to THz radiation. The operation of this embodiment would otherwise be substantially similar.

Frequencies in a range of approximately 0.1 THz to approximately 10 THz may be considered within the THz range of frequencies. In an embodiment, the THz source may be inside of the borehole. The THz source may be based on a radio-source with frequency multiplication or generated from a pulsed laser that creates THz radiation while exciting a semiconductor device.

Converting pulsed laser light into THz radiation may be performed by shining the laser light onto a semiconductor material with an applied electric bias voltage. Each laser pulse creates free electrons and holes inside of the semiconductor. Due to their opposite charge, these charge carriers are accelerated into different directions by the applied bias. Accelerated charges produce electromagnetic radiation and, in the case of the charge carriers in semiconductors, this radiation lies in the THz frequency band.

Another embodiment creates the THz radiation on the surface and propagates it down into the well through waveguides as described previously. THz radiation may be transmitted over relatively long distances (kilometers) using relatively thin (diameter≈½" or less) circular metal pipes acting as waveguides. One example of such a waveguide is illustrated in FIG. 7.

Figure 7:
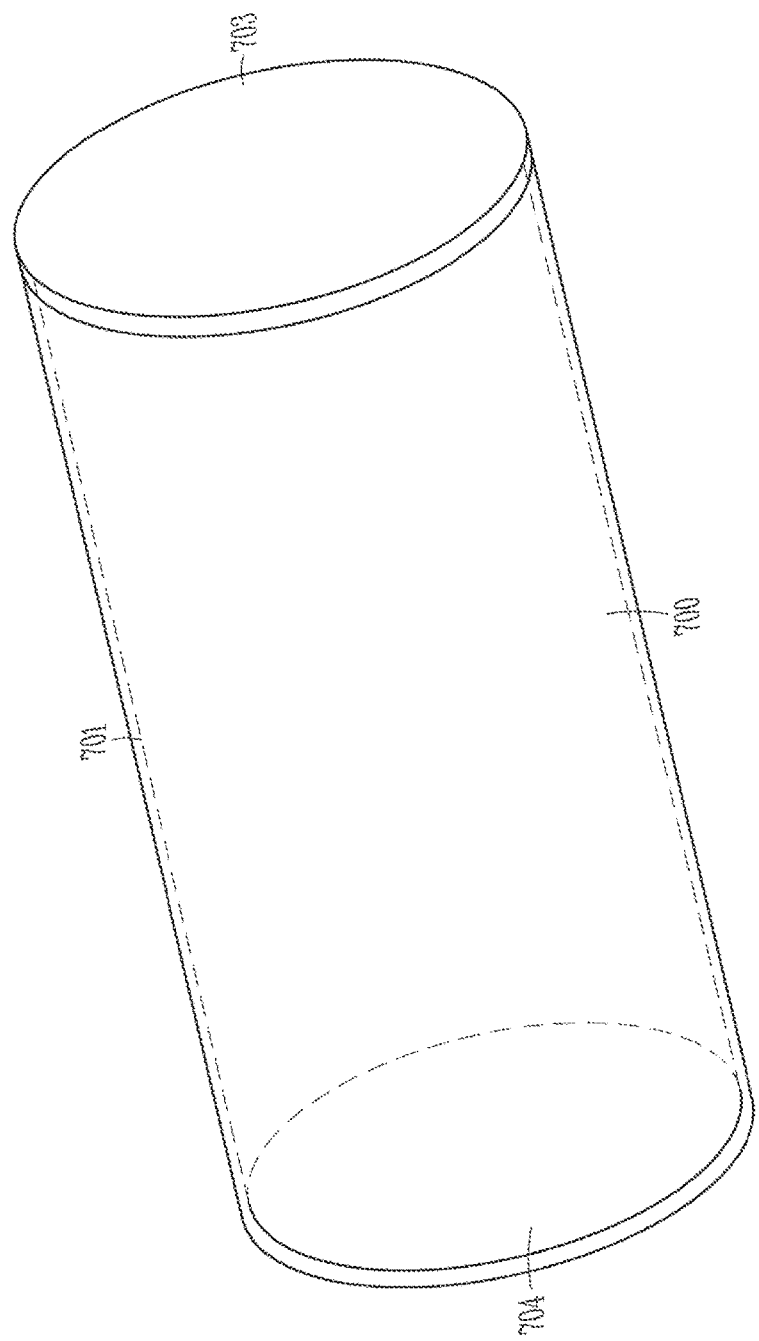
FIG. 7 is a cross-sectional diagram showing a quasi-optical waveguide, according to various embodiments.

FIG. 7 is a cross-sectional diagram showing a quasi-optical waveguide, according to various embodiments. Such a waveguide may be used in propagating frequencies in the THz frequency range downhole to act as the radiation sources.

The waveguide includes a substantially cylindrical body 701 that encloses a chamber 700. The chamber is sealed from the ambient atmosphere by two dielectric plugs 703, 704 (e.g., windows, dielectric windows) on either end of the substantially cylindrical body 701.

The body 701 of the segment may comprise any material that enables the waveguide to propagate THz frequency signals. For example, the body 701 may comprise a metal pipe (e.g., copper). In another embodiment, the body 701 may be some material (e.g. steel or nonmetallic material) and the inner surface of the body 701 may be lined with a metal (e.g. gold).

The body 701 is shown and described as "cylindrical". The "cylindrical" description may include any shape that is approximately cylindrical such as, for example, oval.

The windows 703, 704 may comprise any material that is transparent to THz frequencies as well as able to withstand the temperature and pressures of the downhole environment. For example, the windows 703, 704 may be sapphire or some other similar material.

The windows 703, 704 typically comprise a thickness that is less than a wavelength of the terahertz radiation being propagated through the segment. For example, THz radiation with a frequency of around 0.3 THz has a wavelength of around 1 millimeter (mm). Thus, if the windows have a thickness of substantially less than 1 mm, the THz radiation passes through the windows 703, 704 without being affected by them. In other words, the windows are transparent to the THz radiation. This is based on the general rule that electromagnetic waves cannot resolve any structure that is smaller than their wavelength and, therefore, the waves can penetrate layers that are much thinner than their wavelength. A window 703, 704 with a thickness of less than 0.1 mm may allow a wider range of THz frequencies.

The chamber 700 of the waveguide segment is sealed from the ambient atmosphere by the windows 703, 704 coupled to their respective ends of the axial length of the body 701. Moisture in the atmosphere is known to limit the propagation of signals at THz frequencies. Thus, the chamber 700 of the waveguide may be at an approximate vacuum, a partial vacuum (e.g., less than 1 atmosphere) with a gas having a diffraction index of approximately 1, a gas atmosphere at approximately atmospheric pressure, or a combination of any of these. For example, the gas may be nitrogen, argon, and/or helium.

Figure 8:
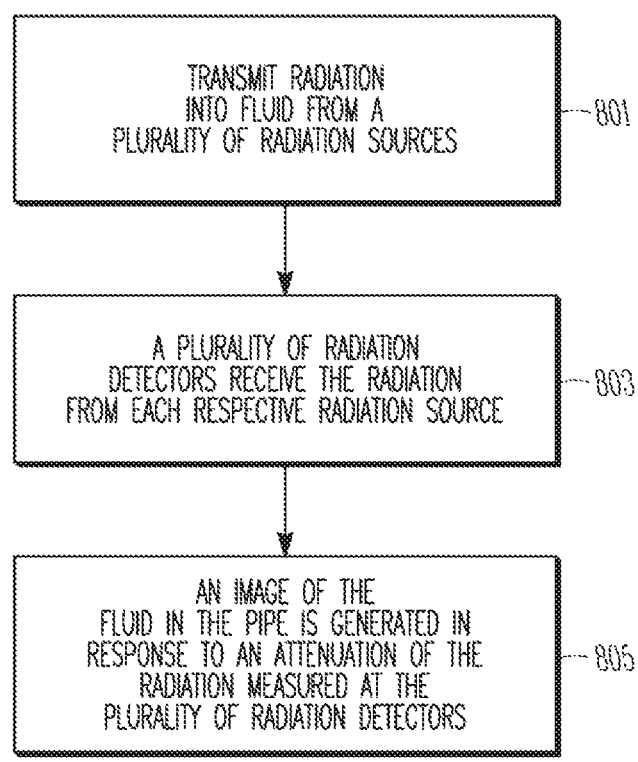
FIG. 8 is a flowchart of a method for fluid imaging in a borehole, according to various embodiments.

FIG. 8 is a flowchart of a method for fluid imaging in a borehole, according to various embodiments. In block 801, radiation is transmitted into a fluid from a plurality of radiation sources. In an embodiment, each respective radiation source of the plurality of radiation sources transmits at a different time from others of the plurality of radiation sources. In block 803, a plurality of radiation detectors receive the radiation from each respective radiation source, wherein the plurality of radiation sources and the plurality of radiation detectors alternate circumferentially around a pipe. In block 805, a chemical composition of the fluid in the borehole may then be determined in response to an attenuation of the radiation measured at the plurality of radiation detectors. In an embodiment, this may be accomplished by generating an image of the fluid in the pipe in response to the attenuation of the radiation measured at the plurality of radiation detectors.

In an embodiment, a subset of the plurality of radiation sources may be on simultaneously instead of each radiation source being respectively on while the other radiation sources are off. As an example, a first measurement is made when a first, a second and a third source are on, while all other sources are off. Then a second measurement is made when the second and the third source are on while all other sources are off. The signals measured in the second measurement are then subtracted from the signals measured in the first measurement and the differential signal is substantially identical to the signal that would have been received by making a measurement where only the first source is on. Thus, this embodiment is substantially equivalent to measuring the radiation from only one source being on at a time.

Figure 9:
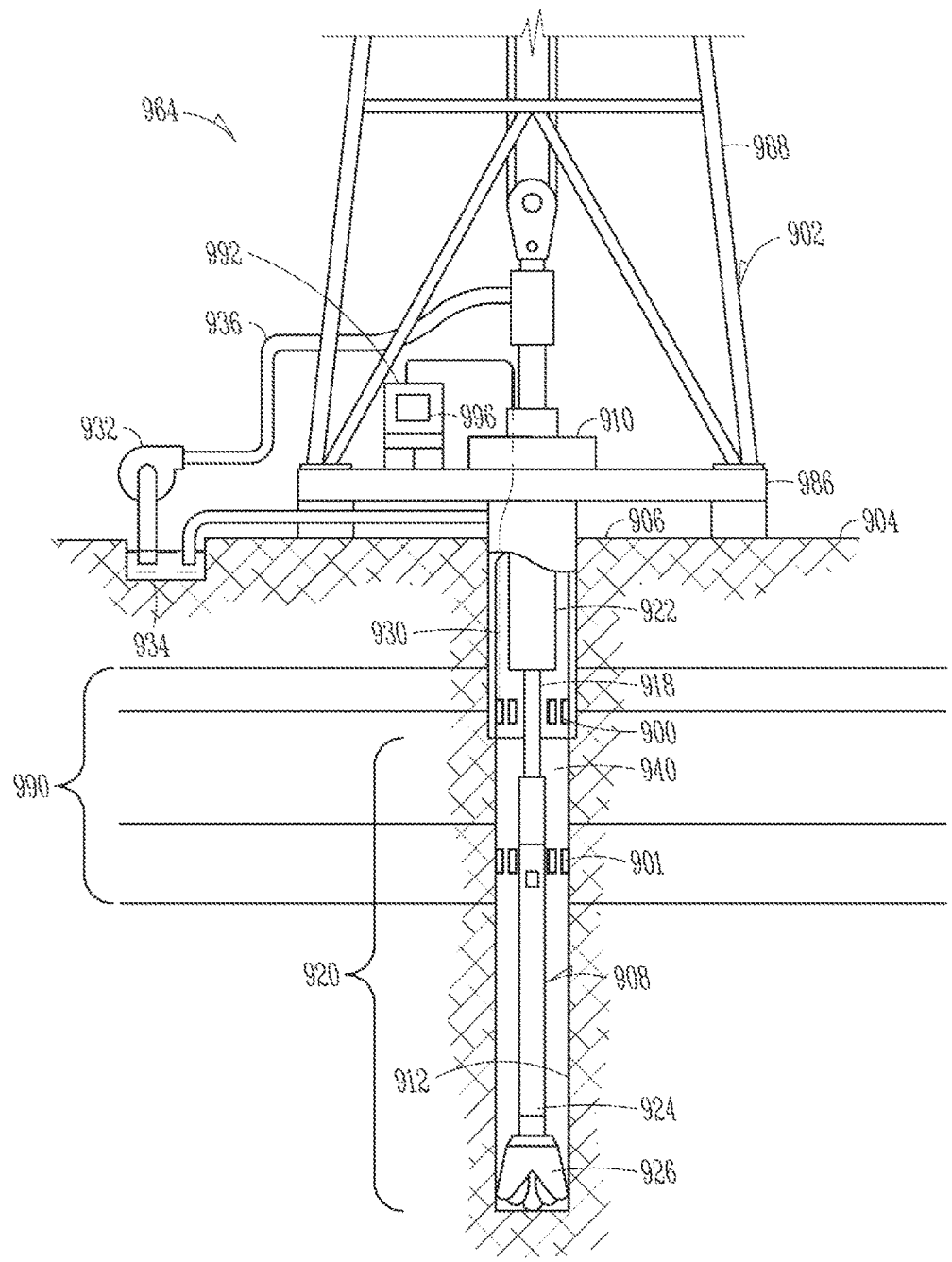
FIG. 9 is a diagram showing a drilling system, according to various embodiments.

FIG. 9 is a diagram showing a drilling system, according to various embodiments. The system 964 includes a drilling rig 902 located at the surface 904 of a well 906. The drilling rig 902 may provide support for a drillstring 908. The drillstring 908 may operate to penetrate the rotary table 910 for drilling the borehole 912 through the subsurface formations 990. The drillstring 908 may include a drill pipe 918 and the bottom hole assembly (BHA) 920 (e.g., drill string), perhaps located at the lower portion of the drill pipe 918.

The BHA 920 may include drill collars 922, a downhole tool 924, stabilizers, sensors, an RSS, a drill bit 926, as well as other possible components. The drill bit 926 may operate to create the borehole 912 by penetrating the surface 904 and the subsurface formations 990. As described previously, the system of radiation sources and radiation detectors 900, 901 may be located circumferentially around the borehole 912. For example, one system 900 may be circumferentially located around a pipe or another system 901 may be circumferentially located around the borehole walls 912.

During drilling operations within the borehole 912, the drillstring 908 (perhaps including the drill pipe 918 and the BHA 920) may be rotated by the rotary table 910. Although not shown, in addition to or alternatively, the BHA 920 may also be rotated by a motor (e.g., a mud motor) that is located downhole. The drill collars 922 may be used to add weight to the drill bit 926. The drill collars 922 may also operate to stiffen the BHA 920, allowing the BHA 920 to transfer the added weight to the drill bit 926, and in turn, to assist the drill bit 926 in penetrating the surface 904 and subsurface formations 990.

During drilling operations, a mud pump 932 may pump drilling fluid (sometimes known by those of ordinary skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some examples, the drilling fluid can be used to cool the drill bit 926, as well as to provide lubrication for the drill bit 926 during drilling operations. Additionally, the drilling fluid may be used to remove subsurface formation cuttings created by operating the drill bit 926.

A workstation 992 including a controller 996 may include modules comprising hardware circuitry, a processor, and/or memory circuits that may store software program modules and objects, and/or firmware, and combinations thereof that are configured to execute at least the method of FIG. 8. The workstation 992 may also include modulators and demodulators for modulating and demodulating a light signal transmitted downhole through one or more fiber optic cables 930 or telemetry received through the one or more fiber optic cables 930 from the downhole environment. The workstation 992 and controller 996 are shown near the rig 902 only for purposes of illustration as these components may be located at remote locations.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Figure 10:
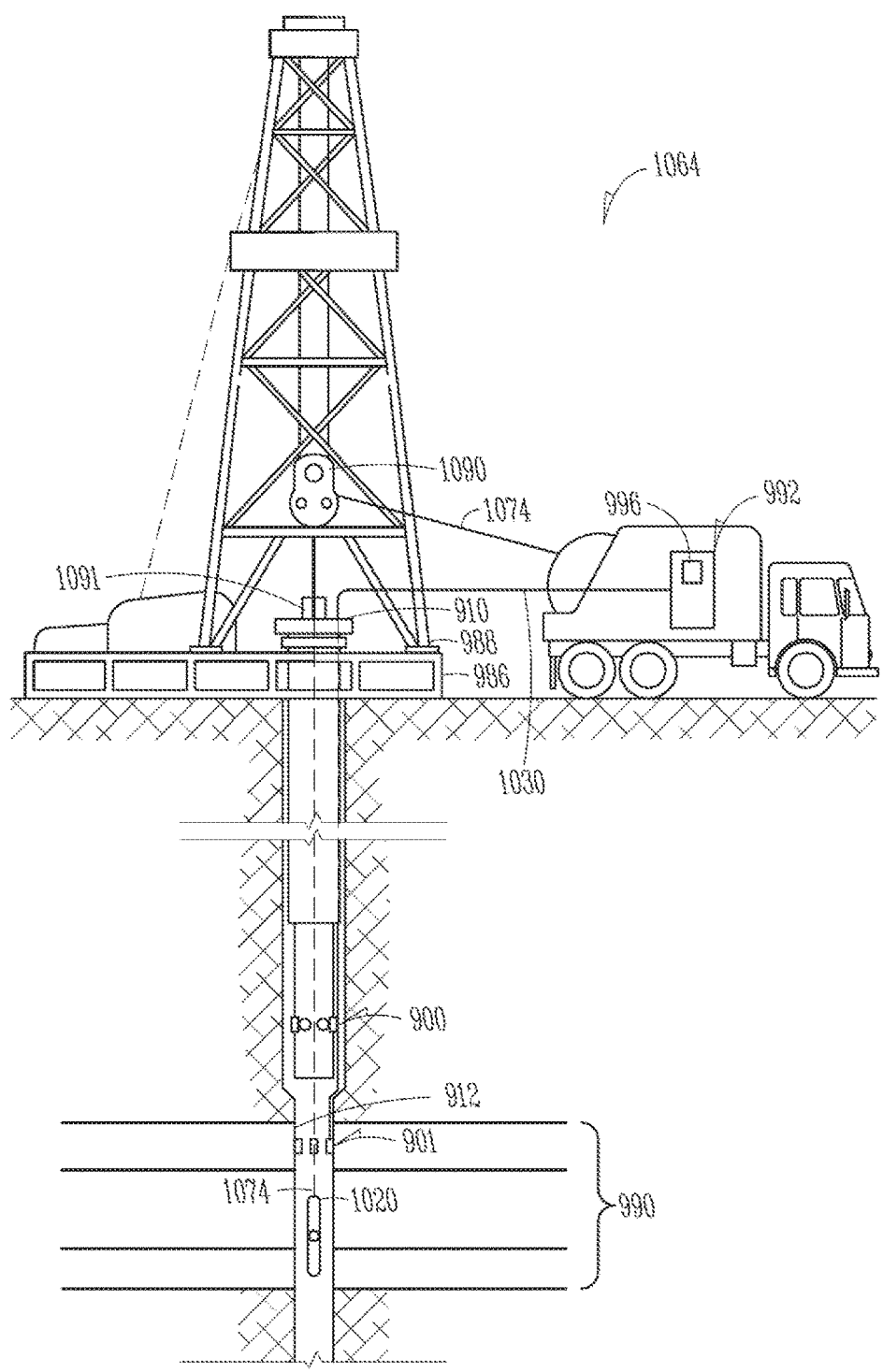
FIG. 10 is a diagram of a wireline system, according to various embodiments.

FIG. 10 is a diagram showing a wireline system 1064, according to various examples of the disclosure. The system 1064 may comprise at least one wireline logging tool body 1020, as part of a wireline logging operation in a borehole 912. As described previously, the system of radiation sources and radiation detectors 900, 901 may be located circumferentially around the borehole 912. For example, one system 900 may be circumferentially located around a pipe or another system 901 may be circumferentially located around the borehole walls 912.

A drilling platform 986 equipped with a derrick 988 that supports a hoist 1090 can be seen. Drilling oil and gas wells is commonly carried out using a string of drill pipes connected together so as to form a drillstring that is lowered through a rotary table 910 into the borehole 912. Here it is assumed that the drillstring has been temporarily removed from the borehole 912 to allow the wireline logging tool body 1020, such as a probe or sonde with the transmitter and/or receiver electro-opto-mechanical devices 900, to be lowered by wireline or logging cable 1074 (e.g., slickline cable) into the borehole 912. Typically, the wireline logging tool body 1020 is lowered to the bottom of the region of interest and subsequently pulled upward at a substantially constant speed.

During the upward trip, at a series of depths, the tool with the transmitter and/or receiver electro-opto-mechanical devices 900 may be used to generate microwave radiation from light and measure fluid chemical composition using the microwave radiation. The resulting fluid chemical composition may be communicated to a surface logging facility (e.g., workstation 992) for processing, analysis, and/or storage. The workstation 992 may have a controller 996 that is able to execute any methods disclosed herein and to operate as part of a downhole microwave generation from light system. The workstation 992 may also include modulators and demodulators for modulating and demodulating a light signal transmitted downhole through one or more fiber optic cables 1030 or telemetry received through the one or more fiber optic cables 1030 from the downhole environment.

Figure 11:
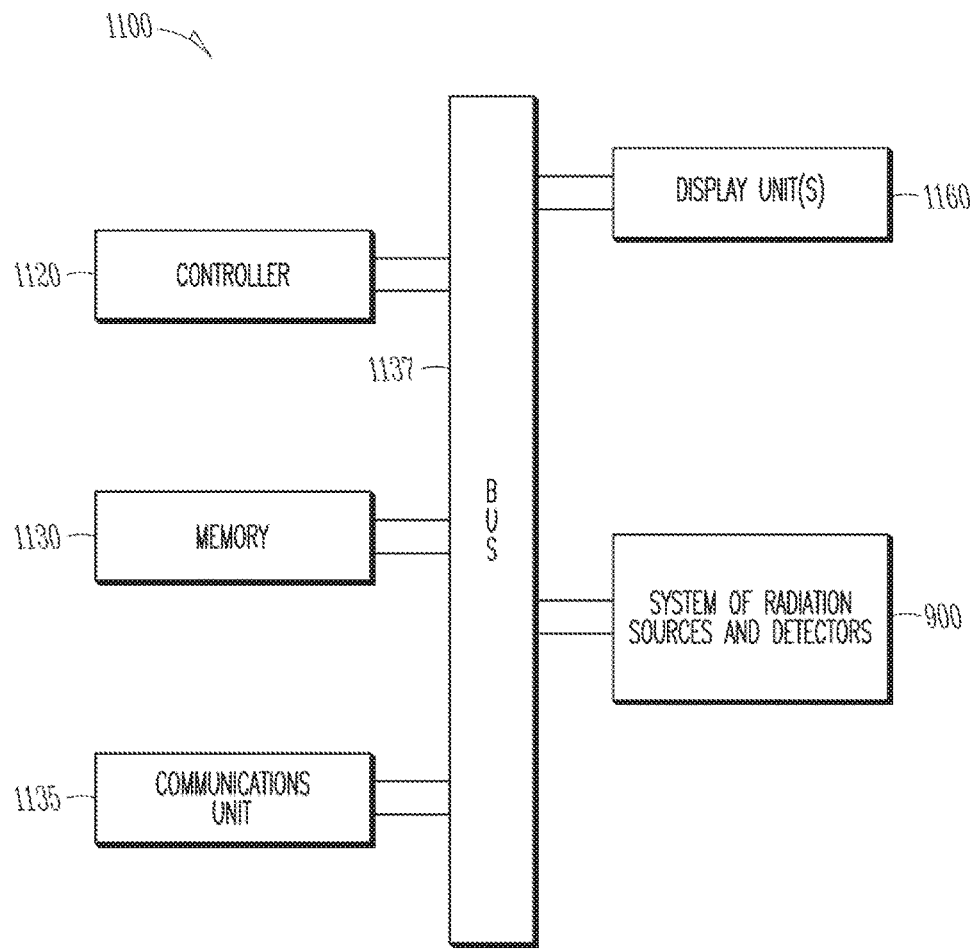
FIG. 11 is a block diagram of an example system operable to implement the activities of multiple methods, according to various embodiments.

FIG. 11 is a block diagram of an example system 1100 operable to implement the activities of multiple methods, according to various examples of the disclosure. The system 1100 may include the transmitter and/or receiver electro-opto-mechanical devices 900. The system 1100 may be implemented as shown in FIGS. 9 and 10 with reference to the workstation 992 and controller 996.

The system 1100 may include a controller 1120, a memory 1130, and a communications unit 1135. The memory 1130 may be structured to include a database. The controller 1120, the memory 1130, and the communications unit 1135 may be arranged to operate as a processing unit to control operation of the system of radiation sources and detectors 900 and execute any methods disclosed herein in order to image the fluid in the borehole in order to determine the water cut or other chemical analysis.

The communications unit 1135 may include communications capability for communicating from downhole to the surface or from the surface to downhole. Such communications capability can include a telemetry system such as mud pulse telemetry. In another example, the communications unit 1135 may use combinations of wired communication technologies and wireless technologies.

The system 1100 may also include a bus 1137 that provides electrical conductivity among the components of the system 1100. The bus 1137 can include an address bus, a data bus, and a control bus, each independently configured or in an integrated format. The bus 1137 may be realized using a number of different communication mediums that allows for the distribution of components of the system 1100. The bus 1137 may include a network. Use of the bus 1137 may be regulated by the controller 1120.

The system 1100 may include display unit(s) 1160 as a distributed component on the surface of a wellbore, which may be used with instructions stored in the memory 1130 to implement a user interface to monitor the operation of the system 1100 or components distributed within the system 1100. The user interface may be used to input parameter values for thresholds such that the system 1100 can operate autonomously substantially without user intervention in a variety of applications. The user interface may also provide for manual override and change of control of the system 1100 to a user. Such a user interface may be operated in conjunction with the communications unit 1135 and the bus 1137.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Example 1 is a system comprising: a plurality of radiation sources located circumferentially around a borehole to transmit radiation into a fluid in the borehole; a plurality of radiation detectors located circumferentially around the borehole, the plurality of radiation detectors to detect the radiation transmitted by each of the respective ones of the plurality of radiation sources; and a controller coupled to the plurality of radiation detectors to determine an attenuation of the radiation at the plurality of detectors and determine a chemical composition of the fluid in response to the attenuation of the radiation.

In Example 2, the subject matter of Example 1 optionally includes wherein the plurality of radiation sources transmit in a frequency band selected from a group consisting of terahertz radiation, microwave radiation, and infrared radiation.

In Example 3, the subject matter of any one or more of Examples 1-2 optionally include wherein the plurality of radiation sources equals the plurality of radiation detectors.

In Example 4, the subject matter of Example 3 optionally includes wherein each of the plurality of radiation detectors is located opposite a respective one of the plurality of radiation sources.

In Example 5, the subject matter of any one or more of Examples 1-4 optionally include wherein the plurality of radiation sources and the plurality of radiation detectors are configured in alternating radiation sources and radiation detectors in a helical pattern circumferentially around the borehole.

In Example 6, the subject matter of any one or more of Examples 1-5 optionally include wherein the plurality of radiation sources and the plurality of radiation detectors are configured in alternating radiation sources and radiation detectors in a circular pattern circumferentially around the borehole.

In Example 7, the subject matter of Example 6 optionally includes wherein the plurality of radiation sources and the plurality of radiation detectors alternate in a plurality of circular patterns circumferentially around the borehole, wherein each circular pattern comprises alternating radiation detectors and radiation sources.

In Example 8, the subject matter of any one or more of Examples 1-7 optionally include wherein each of the plurality of radiation sources comprises a selectable waveguide window.

In Example 9, the subject matter of Example 8 optionally includes wherein each selectable waveguide window is configured to be selectable between being transparent to the radiation and opaque to the radiation.

In Example 10, the subject matter of any one or more of Examples 8-9 optionally include wherein each selectable waveguide window is configured to be switched between open and closed.

Example 11 is a method comprising: transmitting radiation into a fluid from a plurality of radiation sources; receiving, by a plurality of radiation detectors, the radiation from each respective radiation source, wherein the plurality of radiation sources and the plurality of radiation detectors alternate circumferentially around a pipe; and generating an image of the fluid in the pipe in response to an attenuation of the radiation measured at the plurality of radiation detectors.

In Example 12, the subject matter of Example 11 optionally includes wherein transmitting the radiation comprises transmitting terahertz radiation.

In Example 13, the subject matter of any one or more of Examples 11-12 optionally include determining a composition of the fluid in response to the image of the fluid.

In Example 14, the subject matter of Example 13 optionally includes determining a water cut of the fluid in response to the image of the fluid.

Example 15 is a system comprising: a pipe comprising a fluid; a plurality of radiation sources located circumferentially around the pipe, wherein respective ones of the plurality of radiation sources transmits radiation into the fluid at different times from others of the plurality of radiation sources; a plurality of radiation detectors located circumferentially around the pipe, the plurality of radiation detectors to detect the radiation transmitted by each of the respective ones of the plurality of radiation sources; and a controller coupled to the plurality of radiation detectors to determine an attenuation of the radiation at the plurality of detectors and generate an image of the fluid in response to the attenuation of the radiation.

In Example 16, the subject matter of Example 15 optionally includes a plurality of waveguides, each waveguide coupled between a terahertz radiation source and a respective one of the plurality of radiation sources.

In Example 17, the subject matter of any one or more of Examples 15-16 optionally include a light source to generate a light signal; an electro-opto-mechanical device coupled to the light source through a fiber optic cable and further coupled to the plurality of radiation sources, wherein the electro-opto-mechanical device is configured to generate microwave radiation in response to the light signal.

In Example 18, the subject matter of any one or more of Examples 15-17 optionally include a light source to generate a light signal, the light source coupled to an electro-opto-mechanical device through a fiber optic cable, the electro-opto-mechanical device configured to generate microwave radiation in response to the light signal; and a frequency multiplier coupled between the electro-opto-mechanical device and the plurality of radiation sources, the frequency multiplier configured to generate terahertz radiation in response to the microwave radiation.

In Example 19, the subject matter of any one or more of Examples 15-18 optionally include wherein the system is one of a drilling system or a wireline system.

In Example 20, the subject matter of any one or more of Examples 15-19 optionally include wherein each radiation source is a respective source lens and each radiation detector is a respective detector lens, the system further comprising: a plurality of fiber optic cables, each fiber optic cable coupled to a respective lens; a light source coupled to the fiber optic cables that are coupled to a source lens; and a light detector coupled to the fiber optic cables that are coupled to a detector lens.

Although specific examples have been illustrated and described herein, it will be appreciated by those of ordinary skill in the art that any arrangement that is calculated to achieve the same purpose may be substituted for the specific examples shown. Various examples use permutations and/or combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. A system comprising:
a plurality of radiation sources located circumferentially around a borehole to transmit radiation into a fluid in the borehole;
a plurality of radiation detectors located circumferentially around the borehole, the plurality of radiation detectors to detect the radiation transmitted by each of the respective ones of the plurality of radiation sources; and
a controller coupled to the plurality of radiation detectors to determine an attenuation of the radiation at the plurality of detectors and determine a chemical composition of the fluid in response to the attenuation of the radiation.

2. The system of claim 1, wherein the plurality of radiation sources transmit in a frequency band selected from a group consisting of terahertz radiation, microwave radiation, and infrared radiation.

3. The system of claim 1, wherein the plurality of radiation sources equals the plurality of radiation detectors.

4. The system of claim 3, wherein each of the plurality of radiation detectors is located opposite a respective one of the plurality of radiation sources.

5. The system of claim 1, wherein the plurality of radiation sources and the plurality of radiation detectors are configured in alternating radiation sources and radiation detectors in a helical pattern circumferentially around the borehole.

6. The system of claim 1, wherein the plurality of radiation sources and the plurality of radiation detectors are configured in alternating radiation sources and radiation detectors in a circular pattern circumferentially around the borehole.

7. The system of claim 6, wherein the plurality of radiation sources and the plurality of radiation detectors alternate in a plurality of circular patterns circumferentially around the borehole, wherein each circular pattern comprises alternating radiation detectors and radiation sources.

8. The system of claim 1, wherein each of the plurality of radiation sources comprises a selectable waveguide window.

9. The system of claim 8, wherein each selectable waveguide window is configured to be selectable between being transparent to the radiation and opaque to the radiation.

10. The system of claim 8, wherein each selectable waveguide window is configured to be switched between open and closed.

11. A method comprising:
transmitting radiation into a fluid from a plurality of radiation sources;
receiving, by a plurality of radiation detectors, the radiation from each respective radiation source, wherein the plurality of radiation sources and the plurality of radiation detectors alternate circumferentially around a pipe; and
generating an image of the fluid in the pipe in response to an attenuation of the radiation measured at the plurality of radiation detectors.

12. The method of claim 11, wherein transmitting the radiation comprises transmitting terahertz radiation.

13. The method of claim 11, further comprising determining a composition of the fluid in response to the image of the fluid.

14. The method of claim 13, further comprising determining a water cut of the fluid in response to the image of the fluid.

15. A system comprising:
a pipe comprising a fluid;
a plurality of radiation sources located circumferentially around the pipe, wherein respective ones of the plurality of radiation sources transmits radiation into the fluid at different times from others of the plurality of radiation sources;
a plurality of radiation detectors located circumferentially around the pipe, the plurality of radiation detectors to detect the radiation transmitted by each of the respective ones of the plurality of radiation sources; and
a controller coupled to the plurality of radiation detectors to determine an attenuation of the radiation at the plurality of detectors and generate an image of the fluid in response to the attenuation of the radiation.

16. The system of claim 15, further comprising a plurality of waveguides, each waveguide coupled between a terahertz radiation source and a respective one of the plurality of radiation sources.

17. The system of claim 15, further comprising:
a light source to generate a light signal;
an electro-opto-mechanical device coupled to the light source through a fiber optic cable and further coupled to the plurality of radiation sources, wherein the electro-opto-mechanical device is configured to generate microwave radiation in response to the light signal.

18. The system of claim 15, further comprising:
a light source to generate a light signal, the light source coupled to an electro-opto-mechanical device through a fiber optic cable, the electro-opto-mechanical device configured to generate microwave radiation in response to the light signal; and
a frequency multiplier coupled between the electro-opto-mechanical device and the plurality of radiation sources, the frequency multiplier configured to generate terahertz radiation in response to the microwave radiation.

19. The system of claim 15, wherein the system is one of a drilling system or a wireline system.

20. The system of claim 15, wherein each radiation source is a respective source lens and each radiation detector is a respective detector lens, the system further comprising:
a plurality of fiber optic cables, each fiber optic cable coupled to a respective lens;
a light source coupled to the fiber optic cables that are coupled to a source lens; and
a light detector coupled to the fiber optic cables that are coupled to a detector lens.

* * * * *